Aug. 18, 1942.   A. A. HIRST   2,293,340
PROCESS AND APPARATUS FOR SEPARATING GRANULAR MATERIAL
Filed May 31, 1940   3 Sheets-Sheet 3
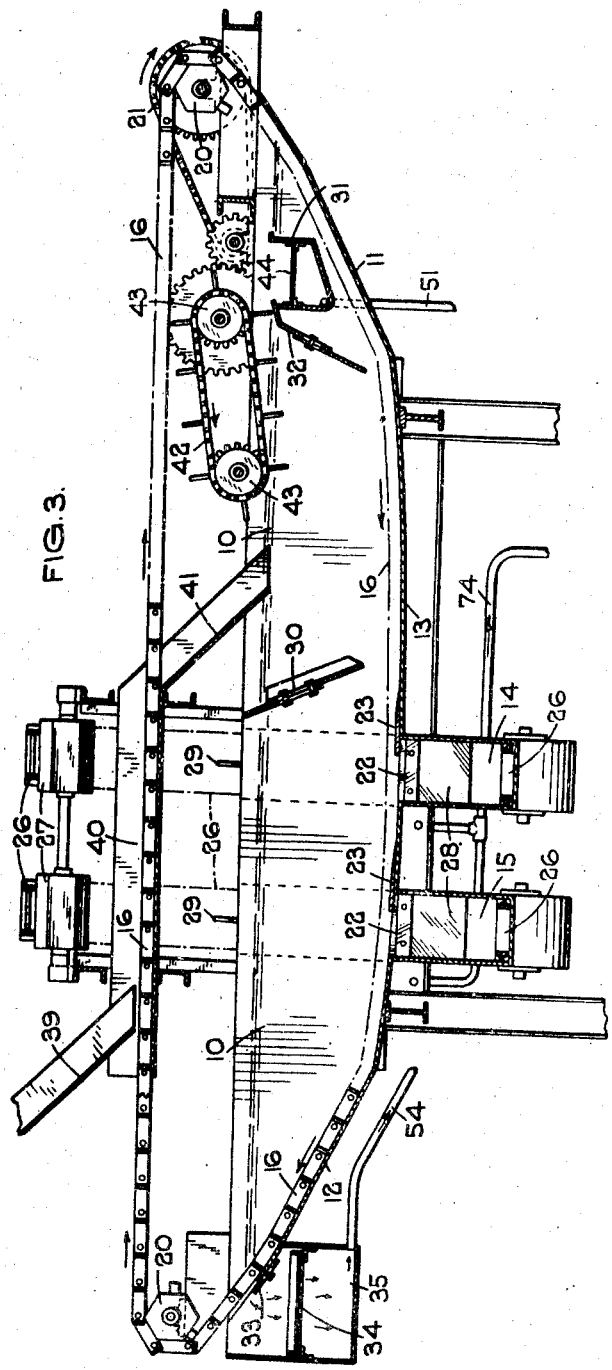
Inventor
ARTHUR A. HIRST
by
Attorneys Patented Aug. 18, 1942

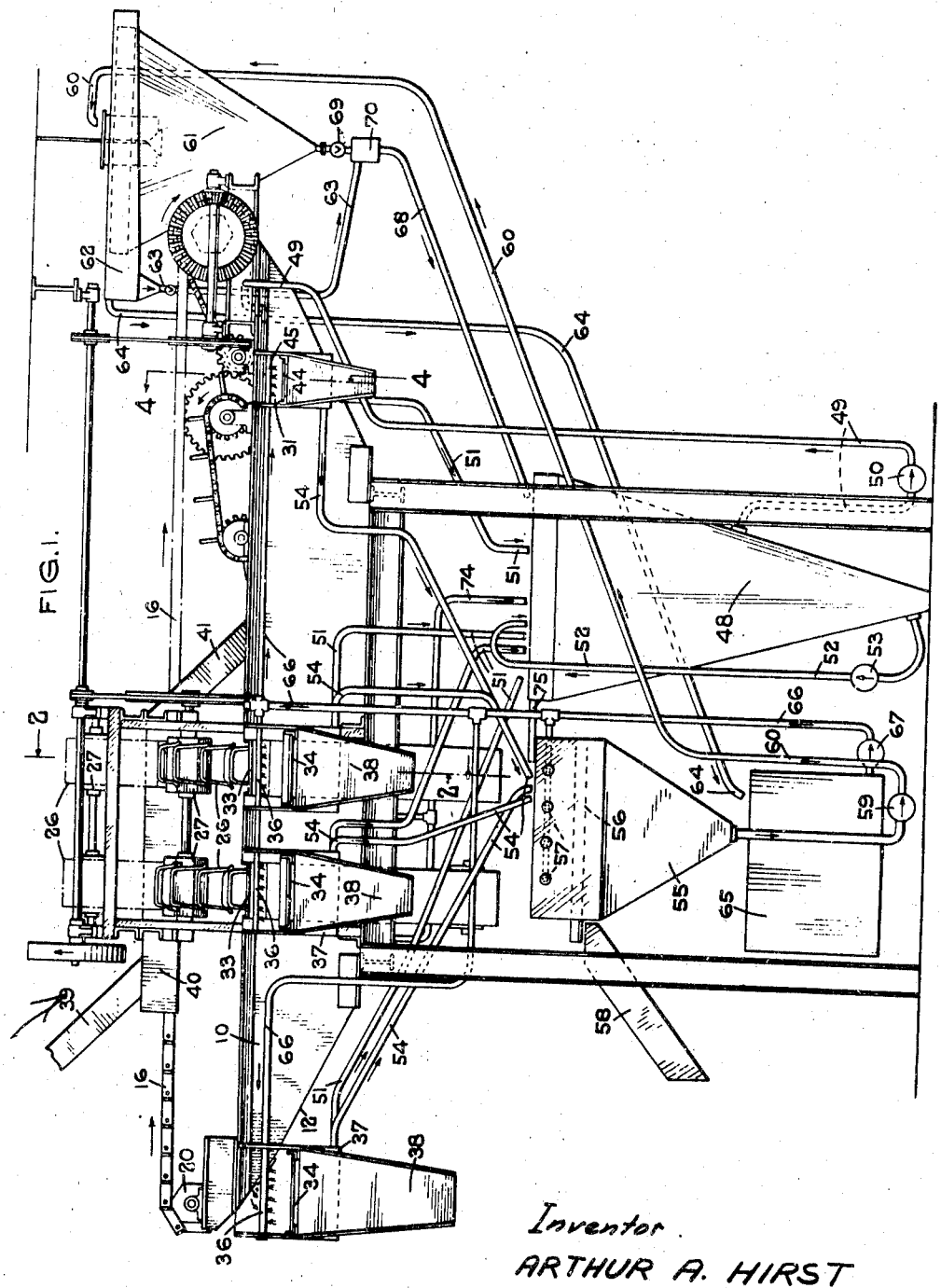

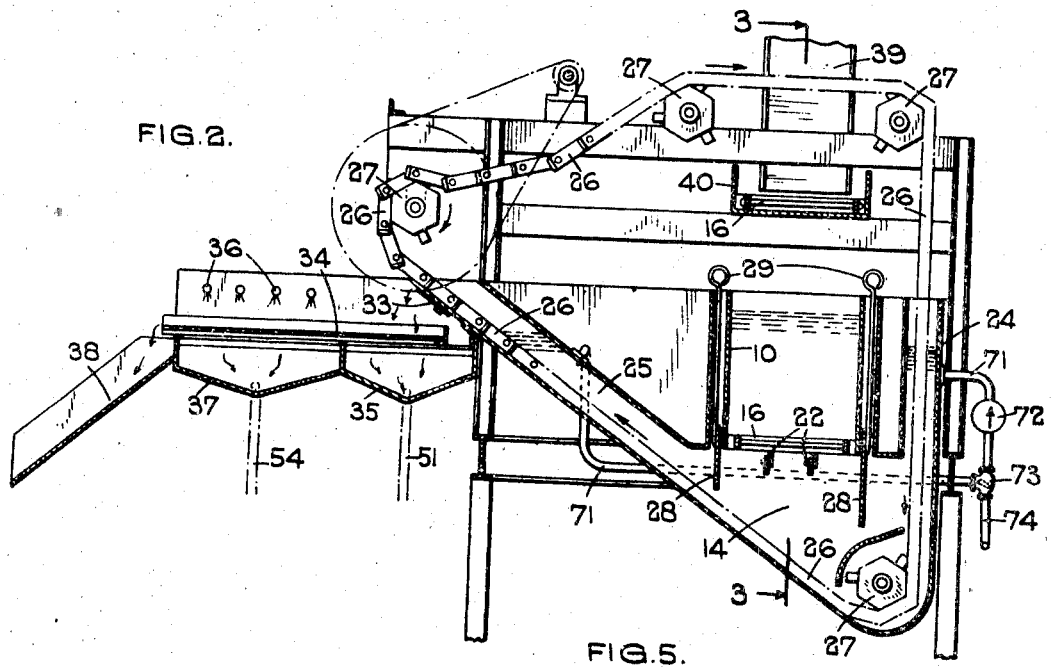

2,293,340

UNITED STATES PATENT OFFICE 2,293,340

PROCESS AND APPARATUS FOR SEPARATING GRANULAR MATERIAL

Arthur Algernon Hirst, Northfield, Birmingham, England, assignor of one-half to Simon-Carves Limited, Cheadle Heath, Stockport, England Application May 31, 1940, Serial No. 338,132
In Great Britain June 5, 1939

10 Claims. (Cl. 209—173)

This invention relates to a process and apparatus for separation of granular material such as coal or ores, the invention being concerned with a process and apparatus for separating materials according to density involving the use of a separating fluid consisting of a suspension of finely comminuted solid in water or other fluid.

Any suitable finely comminuted solid may be used, but for convenience in description the term "sand" is used hereinafter to include any such finely comminuted solid.

The primary object of the present invention is to enable more complete and accurate separation of the different products, so as to minimise the disadvantage of part of one product being removed with another product.

A further object is the provision of means for regulating or controlling the points of separation between the various products separated to enable adjustment of the products or any one of the products.

Referring to the drawings—

Figure 1 is an elevation of one apparatus according to this invention.

Figure 2 is a section on line 2—2 of Figure 1.

Figure 3 is a section on line 3—3 of Figure 2.

Figure 4 is a section on line 4—4 of Figure 1.

Figure 5 is a perspective view of a detail.

In one construction according to this invention the apparatus includes an elongated trough or vessel 10 which is relatively shallow, the base of the trough being inclined at the two ends, namely, the inlet end as indicated at 11 and the outlet end as indicated at 12 in Figure 3, whilst at the centre of the length of the trough and intermediate these ends the base 13 is slightly curved and may if desired be flat and horizontal.

In the part 13 of the base there are two pockets 14 and 15 each of which extends across the complete width of the trough and forms a depression in the base of the trough.

Extending through the trough in the direction of the length thereof is an endless scraper 16 comprising scraping blades 17 of substantially U shape pivoted together on link pins 18 as indicated in Figure 5, the ends of the sides of the U shaped blades being out-turned at 19 to scrape the sides of the trough and prevent deposits or accumulations such as might tend to impede the operation of the scraper.

This scraper is mounted on carrying members 20 rotatably supported at the two ends of the trough, the member 20 at the inlet end of the trough being driven by a drive 21 from the drive means for the apparatus. The lower run of the chain moves over the base of the trough for the complete length of the latter, the direction of movement being such that the chain passes down the inlet end 11 and up the outlet end 12 of the base.

Extending across the open top of each pocket are shield plates 22 disposed vertically and parallel to the length of the trough, such plates serving the dual purpose of acting as guides for the scraper and minimising eddy currents in the top of the pocket. Such shield plates may be adjustable as regards positions and effective depth of plate in the pocket and for this latter purpose each plate may comprise two strips overlapped as shown in Figure 2 and adjustably secured together so that the extent of overlapping can be varied.

A cover plate 23 is mounted adjustably upon the base 13 of the trough adjacent each pocket for movement partially to close the open top of the pocket so that the area of this top can be varied as required or necessary.

Each pocket is provided with extensions 24 and 25 leading upwardly from opposite sides of the pocket, one on either side of the trough as indicated in Figure 2, the extension 24 being vertical and parallel to the depth of the trough, whilst the extension 25 is inclined at an acute angle to the depth of the trough and pocket.

Each pocket is provided with a mechanical scraper 26 for removing from the pocket any material sinking or deposited therein, each scraper passing over carrying members 27 suitably mounted on the supporting structure and driven from the drive means for the apparatus.

The scraper passes downwardly in the extension 24 and upwardly over the inclined base of the extension 25 so that material deposited in the pocket is removed up this inclined base.

Each scraper 26 may be constructed substantially as described and illustrated in the case of the scraper 16.

A pair of vertical plates 28 for each pocket form adjustable baffles one at each side of each pocket, these plates being slidable vertically by the operation of control rods 29 so that the depth of cross flow across the pocket from the extensions 24 and 25 can be regulated.

A transverse partition 30 is mounted in the trough intermediate the ends thereof, this partition extending completely across the width of the trough for a depth less than that of the trough at the position of the partition. This partition comprises two plates placed one upon the other to overlap and secured together in a manner permitting variation of the extent of overlapping so that the effective depth of the partition in the trough can be adjusted.

At the inlet end of the trough there is a transverse channel 31 extending across the width of the trough and provided with an inclined baffle 32, the effective depth of which in the trough can be regulated as described in the case of the partition 30.

Circulating through the trough is a separating fluid comprising a suspension of sand in water or other fluid, the density of the suspension being maintained substantially constant as will hereinafter be described.

At the outlet end 12 of the trough there is an adjustable plate 33 mounted for movement over the end of the inclined portion 12 of the base enabling variation of the effective height of the outlet over which is discharged the material removed by the scraper 16.

Similarly an adjustable plate 33 is mounted at the upper end of the inclined base of the extension 25 of each pocket to enable variation of the effective height of the outlet over which is discharged material removed from the pocket by the mechanical scraper therefor.

Such material removed from the pocket falls upon a perforated screen or jigger 34 shown in Figure 2 and upon the first portion of this screen the material is drained of suspension which is collected in a cone 35, whilst on a further portion the material is sprayed or washed by discharge of liquid from sprays 36, such spray liquid being collected in a cone 37 whilst the washed material is discharged down a chute 38.

This arrangement is duplicated for each of the pockets 14 and 15 and for the material discharged from the outlet end of the trough.

Above the trough is a chute 39 down which is discharged the material to be treated in the apparatus, this material falling into a horizontal channel 40 along which passes the upper run of the scraper 16 which thus operates to move the material along the channel 40 to a further inclined chute 41 leading down into the trough in advance of the partition 30.

In advance of the chute 41 is a comb conveyor 42 mounted on sprockets 43 and driven from the drive means for the apparatus, the rotation of this conveyor being such that the lower run, which dips into the liquid in the trough, tends to engage the product floating in the suspension and to move this product over the baffle 32 and into the channel 31.

This material falls on a perforated screen or jigger 44 and is drained of suspension whilst on the portion of the jigger extending in the transverse channel 31, whilst on a further portion of the jigger the material is washed by discharge from the sprays 45, the spray liquid being collected in a cone 46 whilst the washed material is discharged down a chute 47.

For maintaining substantially constant the density of the suspension in the trough 10 this suspension is circulated between the trough and a reserve tank 48 shown in Figure 1, the suspension being pumped from the tank through a pipe 49 in which is a pump 50 and which discharges into the inlet end of the trough.

The suspension removed from the trough by the operation of the scrapers 16 and 26 is drained from the separated products as above described and this suspension is conveyed back to the reserve tank from the collecting cones 35 and the channel 31 by means of pipes 51.

Intimate mixing of the suspension in the reserve tank 48 is ensured by circulating the suspension within the tank by a circulation pipe 52 in which is a pump 53 and which withdraws suspension from the base of the reserve tank and discharges such suspension into the top of the tank.

The underflow from the collecting cones 37 and 46, namely, the spray medium collected after spraying the separated products, is conveyed by pipes 54 to a dilute suspension tank 55 in the top of which is a fine mesh screen or jigger 56 for separating the liquid from the slurry washed from the separated products by the sprays, such slurry being again sprayed on this screen 56 from sprays 57 and being then discharged down a chute 58.

The under flow from the dilute suspension tank is forced by a pump 59 through a pipe 60 to a settling tank 61 having an overflow rim 62 from which clear suspension is passed back to the reserve tank through a pipe 63, through a density control device 60 for mixing clarified overflow and thickened underflow from the tank 61, whilst an overflow pipe 64 leads from the top of this rim down to a spray medium tank 65 feeding the sprays 36, 45 and 57 through a pipe 66 provided with a pump 67.

The base of the settling tank 61 is connected by a pipe 68 to the reserve tank 48 and in this pipe 68 is a valve 69 and the density control device 60.

Referring to Figure 2 a pipe 71 in which is a pump 72 connects the pocket extensions 24 and 25, the inlet end of the pipe being below the level of suspension in the corresponding extension but the outer end not necessarily being below the level in the corresponding extension. This pipe 71 communicates through a two-way valve 73 with a pipe 74 leading to the reserve tank 48.

By operation of the pump 72 for either pocket, suspension can be circulated between the extensions 24 and 25 to ensure a desired cross flow across the main part of the pocket or to compensate for the effect of the movement of the scraper 26 through the pocket, whilst by means of the bye-pass pipe 74 suspension can be withdrawn at a controlled rate from the pocket and discharged into the reserve tank.

The pipe 74 can be used even if the circulating pipe 71 and pump 72 are omitted.

An overflow 75 from the reserve tank leads into the tank 55.

In operation the material to be treated, for example the coal to be washed or cleaned, is fed down the chute 39 and is moved by the scraper 16 to the chute 41, being discharged thereby into the trough on the inlet side of the partition 30.

For separating coal particles from dirt or foreign matter the specific gravity of the separating fluid may be regulated at a figure of about 1.35, i. e., at a density equal to that at which clean coal flows through the body of the separating fluid to collect at the top of this fluid whilst the dirt or middlings sink in, or remain suspended in, the fluid.

The clean coal flowing in the fluid is moved by the comb conveyor over the partition 32 and on to the screen 44 where the coal is first drained of suspension and is then sprayed prior to being discharged down the clean coal chute 47.

Material falling through the separating fluid is carried by the scraper 16 over the first pocket 14 and the heaviest material falls into this pocket and is given a further separation treatment therein.

The specific gravity of the suspension in the first pocket 14, is, for example, maintained at a figure of 1.8 as will be referred to later herein and the particles of heavy dirt fall to the bottom of the pocket, whilst lighter dirt or middlings float to the top of the pocket and are removed by the scraper 16.

Material not heavy enough to fall into the pocket 14 is carried on by the scraper to the pocket 15 where the specific gravity of the suspension is maintained at a figure of 1.5 and again the material is separated into a heavy product falling in the pocket to the base thereof and lighter material floating in the pocket.

The product falling to the base of each pocket is removed from the pocket by the scraper 26 and is discharged on to the screen 34 for the particular pocket, being drained clear of suspension and then sprayed prior to discharge down the chute 38.

Material retained by the scraper after passing over the top of the pocket 14 is moved up the inclined portion 12 of the base of the trough and is discharged over the outlet 33 on to the screen where it is drained and sprayed prior to discharge down the appropriate chute.

The pockets or zones containing suspension of greater density than that in the main separating trough and arranged in the base of this trough may be likened to U tubes, one limb of which communicates with the main trough, whilst the other limb is open to the atmosphere. Since the suspension in the pocket is denser than that in the main trough it is clear that for conditions of equilibrium the level of the suspension in the limb of the pocket communicating with the atmosphere, i. e., in the pocket extensions 24 and 25, must be lower than the level of suspension in the main trough.

It follows that the suspension in the pocket must not be allowed to overflow freely at this lower level otherwise suspension would flow into the pocket from the main trough, thereby tending to reduce the density of the suspension in the pocket to that of the suspension in the main trough.

On the other hand, if there is no outlet whatsoever for the suspension and, if any, settled sand from the pocket, the suspension in the pocket will tend to consolidate and cause the pocket to become choked with settled sand.

In order to maintain, in the pocket, a suspension with a density greater than that in the main trough whilst avoiding this choking, it is necessary to withdraw suspension and settled sand from the pocket in controlled amounts.

According to the present invention this is effected in one or both of two ways.

The first is by providing a controlled outlet for suspension and settled sand in the pocket or the limb communicating therewith at a level below the surface of the suspension in the limb communicating with the atmosphere.

The second is to design the means for withdrawing the particles sinking into the pocket so that in addition to such particles suspension and settled sand may also be evacuated in controlled quantities. In the latter case the control of the removal of suspension and settled sand is effected by variations in the form of the scraper or by varying its speed.

In general the density of the suspension in the pocket will be greater or less according as the quantity of suspension and settled said removed is less or greater respectively.

The suspension and settled sand are removed from the pocket at a level below that of the separating fluid in the tank as distinct from a mere overflow leading from the pocket.

With an endless or other scraper for removing the suspension, settled sand and material sinking in the suspension from the pocket, the form and speed of operation of the scraper control the rate of removal of suspension and settled sand and thus control the effective density of the material remaining in the pocket, whilst with a controlled outlet arrangement the extent and period of opening of the outlet similarly controls the pocket density. With the controlled outlet arrangement the material sinking in the suspension in the pocket may be evacuated by means of a mechanical scraper or other suitable means.

One pocket may be provided with a bucket type scraper, i. e., one provided with hollow or bucket-type blades, whilst the scraper in a further pocket may be provided with flat blades so that the amount of suspension or settled sand removed from the two pockets will be different and accordingly the density of the suspension in the two pockets will be different.

For evacuating the suspension, settled sand and separated material from a pocket a mechanical scraper or similar device is preferred to a bucket elevator.

A scraper can be arranged to sweep the whole area of the lower portion or settling zone of a shallow pocket, whereas a bucket elevator requires a tapered inlet and elevator boot, thus increasing the effective depth of the pocket; It is easier to maintain a suspension of substantially uniform density in a shallow pocket than in one of greater depth. Moreover a scraper tends to maintain to some extent a condition of uniform density in the pocket since if the density of the suspension increases the viscosity of the suspension and the quantity of settled sand both increase so that a greater quantity of suspension or settled sand adheres to the scraper and is evacuated, bringing about a reduction in the density of the suspension.

If the density of the suspension increases, the viscosity of the suspension and the quantity of settled sand decrease so that a smaller quantity of suspension and settled sand is evacuated, consequently the density of the suspension tends to increase. Also when a mechanical scraper is used it is possible to control the quantity of suspension and settled sand evacuated in a convenient fashion by means of the adjustable plate 33 in the base of the scraper casing at the outlet or delivery end. If this plate is lowered the quantity of material removed by the scraper is increased whilst if the plate is raised the quantity removed is decreased.

The apparatus may be provided with one or any number of pockets according to the grades of material desired to be separated.

In the example above referred to a third pocket may be provided nearest the outlet end of the trough and the specific gravity of the suspension in the pocket may be maintained at a figure of 1.35, i. e., approximating to that of the main suspension in the trough.

There may be a tendency for the density of the main suspension to fall slightly towards the outlet end of the trough, namely, to a figure of about 1.33 and this facilitates the deposition in the last pocket of material having a density of about 1.35.

The material deposited in all the pockets can be removed separately and in this way three or more grades of heavy material of densities greater than that of the clean coal can be removed separately from the apparatus.

It will be appreciated that the figures given above for the densities in the various parts of the apparatus are only included by way of example and the density in the trough and in any of the pockets may be regulated at any convenient figure depending upon the materials to be separated and upon the grades of such material desired to be separately collected.

Also, when a reserve tank is connected in circuit with the pocket and its extensions, the suspension and settled sand removed from the lower part of the pocket may be discharged into the reserve tank where the density of the suspension is adjusted to that required for the pocket, by admixing as required suspension of a greater or lesser density; suspension of the correct density being recirculated back to the pocket. The reserve tank may be provided with an overflow into the reserve tank for the main circulation so that the excess of suspension withdrawn from the pocket together with any excess suspension produced in adjusting the density of the suspension in the reserve tank is returned to the main circulation; this arrangement also provides a substantially constant circulation in the pocket.

The suspension in a reserve tank for the main circulation or in a reserve tank in circuit with a pocket and its extensions, if any, may be automatically stirred in order to maintain a suspension of uniform density.

The circulation in the or each pocket can be maintained by means of one or more air lifts, or the scraping device can be arranged to produce a circulation, but it is preferable to use a pump or the like for the main circulation.

What I claim is:

1. A process for separating granular material involving the steps of introducing the material to be treated into a main body of separating fluid, such main body being ribbon-like or shallow in relation to its length and being of substantially constant density throughout, subjecting said material to a primary separation treatment in said main body of fluid, removing the granular material floating in said main body, subjecting the material sinking in said main body of separating fluid to a secondary separation treatment in a pocket of separating fluid projecting downwardly from the underside of said main body and extending for a relatively short distance along the length of said main body, the density of said pocket of separating fluid being substantially constant throughout and being greater than the density of the main body of separating fluid, maintaining the density of said pocket substantially constant by removing material from the pocket in a controlled manner, returning into the main body of separating fluid the material last floating from said pocket, removing said last mentioned floating material separately of the material floating in said main body, and removing separately the material sinking in said pocket.

2. A process for separating granular material involving the steps of introducing the material to be treated into a main body of separating fluid, such main body being ribbon-like or shallow in relation to its length and being of substantially constant density throughout, subjecting said material to a primary separation treatment in said main body of fluid, removing the granular material floating in said main body, subjecting the material sinking in said main body of separating fluid to a secondary separation treatment in a plurality of pockets of separating fluid projecting downwardly from the underside of said main body, each of said pockets extending for a relatively short distance along the length of said main body, the density of each of said pockets of separating fluid being substantially constant throughout and being greater than the density of the main body of separating fluid, maintaining the density of each of said pockets substantially constant by removing material from the pocket in a controlled manner, introducing said sinking material first into a pocket of maximum density, returning into the main body of separating fluid the material floating from said pocket, introducing said last mentioned floating material into a further pocket of density less than that of the first mentioned pocket but greater than that of the main body of separating fluid, returning into the main body of separating fluid the material floating from said further pocket, removing said last mentioned floating material separately of the material floating in said main body, and removing separately the material sinking in said pockets.

3. A process for separating granular material according to claim 1, involving the removal from said pocket in controlled amounts of settled sand together with separating fluid for maintaining the density of said pocket substantially constant.

4. Apparatus for separating granular material including an elongated vessel shallow in relation to its length, said vessel containing a separating fluid of substantially constant density throughout and consisting of a suspension of finely comminuted solid, a pocket projecting downwardly from the base of said vessel and extending for a short distance along the length of the base, said pocket containing a suspension the density of which is maintained substantially constant throughout at a figure greater than that of the main body of separating fluid, means for removing the granular material floating in said main body, means for moving to said pocket any material sinking in said vessel so as to subject such material to a further separation in said pocket, an extension on each of two opposite sides of said pocket each extension communicating with, and projecting upwardly from, the bottom of the pocket to a height above the level of fluid in the said vessel, a mechanical conveyor for said pocket, said conveyor passing down one extension of the pocket across the bottom of the pocket and up the other extension of the pocket for removing the material sinking in the said pocket and means for removing the material floating from said pocket but sinking in the main body of fluid, said last mentioned material being removed separately of the material floating in the main body of fluid and separately of the material sinking in said pocket.

5. Apparatus according to claim 4 including means for circulating suspension in said pocket between the extensions thereof by withdrawing suspension in controlled amounts from one extension and discharging such withdrawn suspension into the other extension of the pocket.

6. Apparatus for separating granular material including an elongated vessel shallow in relation to its length, said vessel containing a separating fluid of substantially constant density throughout and consisting of a suspension of finely comminuted solid, a pocket projecting downwardly from the base of said vessel and extending for a short distance along the length of the base, said pocket containing a suspension the density of which is maintained substantially constant throughout at a figure greater than that of the main body of separating fluid, means for removing the granular material floating in said main body, means for moving to said pocket any material sinking in said vessel so as to subject such material to a further separation in said pocket, an extension on each of two opposite sides of said pocket each extension communicating with, and projecting upwardly from, the bottom of the pocket to a height above the level of fluid in the said vessel, the suspension in said extensions having a free surface with the atmosphere without an overflow, an endless link scraper conveyor for said pocket said conveyor passing down one extension of the pocket across the bottom of the pocket horizontally and transversely of the length of the vessel and up the other extension of the pocket for removing the material sinking in said pocket and means for removing the material floating from said pocket but sinking in the main body of fluid, said last mentioned material being removed separately of the material floating in the main body of fluid and separately of the material sinking in said pocket.

7. Apparatus according to claim 4 including controllable means for varying the strength of the cross flow in said pocket between the extensions thereof.

8. Apparatus for separating granular material including an elongated vessel shallow in relation to its length, said vessel containing a separating fluid of substantially constant density throughout and consisting of a suspension of finely comminuted solid, a pocket projecting downwardly from the base of said vessel and extending for a short distance along the length of the base, said pocket containing a suspension the density of which is maintained substantially constant throughout at a figure greater than that of the main body of separating fluid, means for removing the granular material floating in said main body, means for moving to said pocket any material sinking in said vessel so as to subject such material to a further separation in said pocket, an extension on each of two opposite sides of said pocket, each extension communicating with, and projecting upwardly from, the bottom of the pocket to a height above the level of fluid in the said vessel, the suspension in said extensions having a free surface with the atmosphere without an overflow, an endless link scraper conveyor for said pocket, said conveyor passing down one extension of the pocket across the bottom of the pocket horizontally and transversely of the length of the vessel and up the other extension of the pocket for removing the material sinking in said pocket, adjustable means for controlling the area of the openings between the pocket and its extensions for regulating the strength of the cross flow in said pocket between said extensions and means for removing the material floating from said pocket but sinking in the main body of fluid said last mentioned material being removed separately of the material floating in the main body of fluid and separately of the material sinking in said pocket.

9. Apparatus for separating granular material including an elongated vessel shallow in relation to its length, said vessel containing a main body of separating fluid of substantially constant density throughout and consisting of a suspension of finely comminuted solid, a plurality of pockets at spaced positions along the length of said vessel, each of said pockets projecting downwardly from the base of the vessel and extending for a short distance along the length of the base, each pocket containing a suspension of density substantially constant throughout and greater than that of the main body of fluid, means for moving to the first of said pockets the material sinking in said vessel, means for moving the material floating from said first pocket to a further pocket containing separating fluid of density less than that of the fluid in the first pocket but greater than that of the main body of fluid in the vessel, an extension on each of two opposite sides of each of said pockets each extension communicating with, and projecting upwardly from, the bottom of the pocket to a height above the level of fluid in the said vessel, a mechanical conveyor for each of said pockets, said conveyor passing down one extension of the pocket across the bottom of the pocket and up the other extension of the pocket for removing the material sinking in said pocket and means for removing the material floating from said further pocket but sinking in the main body of fluid, said last mentioned material being removed separately of the material floating in the main body of fluid and separately of the material sinking in said pockets.

10. Apparatus for separating granular material including an elongated vessel shallow in relation to its length, said vessel containing a main body of separating fluid of substantially constant density throughout and consisting of a suspension of finely comminuted solid, a plurality of pockets at spaced positions along the length of said vessel, each of said pockets projecting downwardly from the base of the vessel and extending for a short distance along the length of the base, each pocket containing a suspension of density substantially constant throughout and greater than that of the main body of fluid, an endless link scraper moving along the base of the vessel for moving to the first of said pockets the material sinking in said vessel, said endless scraper moving the material floating from said first pocket to a further pocket containing separating fluid of density less than that of the fluid in the first pocket but greater than that of the main body of fluid in the vessel, an extension on each of two opposite sides of each of said pockets, each extension communicating with, and projecting upwardly from, the bottom of the pocket to a height above the level of fluid in the said vessel, the suspension in said extensions having a free surface with the atmosphere without an overflow, a mechanical conveyor for each of said pockets, said conveyor passing down one extension of the pocket across the bottom of the pocket horizontally and transversely of the length of the vessel and up the other extension of the pocket for removing the material sinking in said pocket, adjustable means for each pocket for controlling the area of the openings between the pocket and its extensions for regulating the strength of the cross flow in said pocket between said extensions, and said endless scraper removing the material floating from said further pocket but sinking in the main body of fluid, said last mentioned material being removed separately of the material floating in the main body of fluid and separately of the material sinking in said pockets.

ARTHUR A. HIRST.